(12) United States Patent
Chang et al.

(10) Patent No.: US 9,985,521 B1
(45) Date of Patent: May 29, 2018

(54) VOLTAGE SYSTEM

(71) Applicant: NANYA TECHNOLOGY CORPORATION, New Taipei (TW)

(72) Inventors: Chuan-Jen Chang, Hsinchu County (TW); Ting-Shuo Hsu, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 0 days. days.

(21) Appl. No.: 15/487,121

(22) Filed: Apr. 13, 2017

(51) Int. Cl.
*H02M 3/156* (2006.01)

(52) U.S. Cl.
CPC .................. *H02M 3/156* (2013.01)

(58) Field of Classification Search
CPC ................................... H02M 3/156
See application file for complete search history.

(56) References Cited

U.S. PATENT DOCUMENTS

| | | | |
|---|---|---|---|
| 6,160,430 A | 12/2000 | Drapkin et al. | |
| 6,229,289 B1* | 5/2001 | Piovaccari | H02M 3/1588 323/268 |
| 9,857,819 B1* | 1/2018 | Lu | G05F 1/62 |
| 2008/0079403 A1* | 4/2008 | Lipcsei | H02M 3/06 323/269 |
| 2008/0084195 A1* | 4/2008 | Frew | G06F 1/263 323/282 |
| 2014/0159683 A1 | 6/2014 | Pan et al. | |

FOREIGN PATENT DOCUMENTS

| | | |
|---|---|---|
| CN | 101018018 A | 8/2007 |
| CN | 101477401 A | 7/2009 |
| TW | 200715102 A | 4/2007 |
| TW | 201635754 A | 10/2016 |

* cited by examiner

*Primary Examiner* — Jue Zhang

(74) *Attorney, Agent, or Firm* — Muncy, Geissler, Olds & Lowe, P.C.

(57) ABSTRACT

A voltage system includes a switch device configured to regulate an output voltage at an output port of the voltage system; a pull-up device configured to pull up the output voltage of the voltage system while the pull-up device is activated; and a control device configured to activate the pull-up device when the output voltage is lower than a reference voltage.

7 Claims, 7 Drawing Sheets

VOLTAGE SYSTEM

TECHNICAL FIELD

The present disclosure relates to a voltage system, and more particularly, to a voltage system including a pull-up device.

DISCUSSION OF THE BACKGROUND

Voltage Regulators (VRs) are generally used in power delivery applications in which an input voltage needs to be transformed to an output voltage in ratios that range from smaller than unity to greater than unity.

This Discussion of the Background section is provided for background information only. The statements in this Discussion of the Background are not an admission that the subject matter disclosed in this section constitutes prior art to the present disclosure, and no part of this section may be used as an admission that any part of this application, including this Discussion of the Background section, constitutes prior art to the present disclosure.

SUMMARY

One aspect of the present disclosure provides a voltage system. The voltage system includes a switch device configured to regulate an output voltage at an output port of the voltage system; a pull-up device configured to pull up the output voltage of the voltage system while the pull-up device is activated; and a control device configured to activate the pull-up device when the output voltage is lower than a reference voltage.

In some embodiments, the control device is further configured to obtain a sensed output voltage by sensing the output voltage, and configured to, based on the sensed output voltage, determine whether to activate the pull-up device.

In some embodiments, the control device is directly connected to the output port.

In some embodiments, when the pull-up device is activated, the switch device contributes a first portion of a current conducting to the output port, and the pull-up device contributes a second portion of the current.

In some embodiments, the control device includes a modulation device and a controller independent from each other, wherein the modulation device is configured to, based on a basis reference voltage and the output voltage, adjust a duty cycle of the switch device, and the controller is configured to, based on the reference voltage and the output voltage, determine whether to activate the pull-up device.

In some embodiments, during a period of time in which the output voltage is lower than the reference voltage, the controller continually activates the pull-up device.

In some embodiments, the pull-up device includes a transistor. The transistor includes a source of the transistor connected to a supply voltage port, and a drain of the transistor coupled to the output port.

In some embodiments, a gate of the transistor is controlled by the controller.

In some embodiments, the switch device receives a basis supply voltage different from the supply voltage.

In some embodiments, the supply voltage is higher than the basis supply voltage.

In some embodiments, the transistor is a second transistor, and the switch device includes a first transistor. The first transistor includes a first drain and a first source. The first source of the first transistor is coupled to a basis supply voltage port. The first drain of the first transistor is coupled to the output port.

Another aspect of the present disclosure provides a method of operating a voltage system, comprising: regulating an output voltage of the voltage system by a switch device; determining whether the output voltage is lower than a reference voltage; deactivating a pull-up device configured to pull up the output voltage when the determination indicates that the output voltage is higher than the reference voltage; and pulling up the output voltage by activating the pull-up device when the determination indicates that the output voltage is lower than the reference voltage.

In some embodiments, the method comprises sensing the output voltage. The determining whether the output voltage is lower than the reference voltage further includes using the sensed output voltage as a basis for the determining whether the output voltage is lower than the reference voltage.

In the present embodiment, due to connection of the pull-up device 204 to the supply voltage VDD2, while the pull-up device 204 is activated, the supply voltage VDD2 charges, for example, the capacitor through the pull-up device 204. During the period while the pull-up device 204 is activated, the supply voltage VDD2 continually charges the capacitor. That is, while the pull-up device 204 is activated, the capacitor is charged not only by the basis supply voltage VDD1 through the switch device 202, but also by the supply voltage VDD2 through the pull-up device 204. As a result, a relatively short recovery time is required to increase the output voltage Vout from a drastically reduced level back to a desired level.

In some existing voltage systems, the existing voltage system may only include a device configured to regulate an output voltage of the existing voltage system. That is, a capacitor coupled to an output port of the existing voltage system is charged only by a single voltage through the device. When an operation mode of a load coupled to the output port is changed from a light-load mode to a heavy-load mode, the output voltage Vout0 may drop drastically. In such scenario, a relatively long time is required to increase the output voltage from a drastically reduced level back to a desired level.

The foregoing has outlined rather broadly the features and technical advantages of the present disclosure in order that the detailed description of the disclosure that follows may be better understood. Additional features and advantages of the disclosure are described hereinafter, and form the subject of the claims of the disclosure. It should be appreciated by those skilled in the art that the conception and specific embodiment disclosed may be readily utilized as a basis for modifying or designing other structures or processes for carrying out the purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
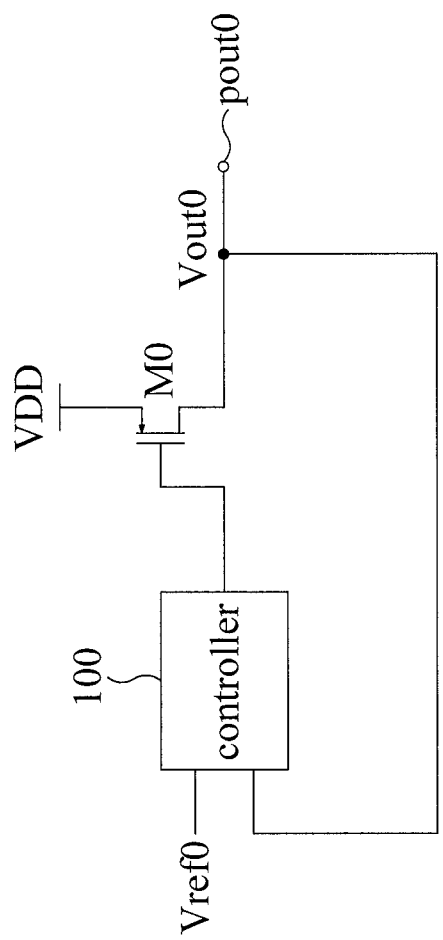
FIG. 1 is a circuit diagram of a voltage system, in accordance with a comparative embodiment of the present disclosure.

Embodiments, or examples, of the disclosure illustrated in the drawings are now described using specific language. It shall be understood that no limitation of the scope of the disclosure is thereby intended. Any alteration or modification to the described embodiments, and any further applications of principles described in this document, are to be considered as normally occurring to one of ordinary skill in the art to which the disclosure relates. Reference numerals may be repeated throughout the embodiments, but this does not necessarily require that feature(s) of one embodiment apply to another embodiment, even if they share the same reference numeral.

It shall be understood that when an element is referred to as being "connected to" or "coupled with" another element, it may be directly connected to or coupled to the other element, or intervening elements may be present.

It shall be understood that, although the terms first, second, third, etc. may be used herein to describe various elements, components, regions, layers or sections, these elements, components, regions, layers or sections should not be limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It shall be further understood that the terms "comprises" and "comprising," when used in this specification, specify the presence of stated features, integers, steps, operations, elements, or components, but do not preclude the presence or addition of one or more other features, integers, steps, operations, elements, components, or groups thereof.

FIG. 1 is a circuit diagram of a voltage system 10, in accordance with a comparative embodiment of the present disclosure. Referring to FIG. 1, the voltage system 10 operates in a power domain defined by a basis supply voltage VDD. The voltage system 10 includes a controller 100 and a transistor M0.

The transistor M0, coupled between the basis supply voltage VDD and an output port pout0 of the voltage system 10, functions to regulate an output voltage Vout0 at the output port pout0 of the voltage system 10. In further detail, due to connection of the transistor M0 to the basis supply voltage VDD, when the transistor M0 conducts for a relatively long time, the basis supply voltage VDD charges, for example, a capacitor (not shown) coupled to the output port pout0 for a relatively long time. As such, a voltage level of the output voltage Vout0 is relatively high. Alternatively, when the transistor M0 conducts for a relatively short time, the basis supply voltage VDD charges the capacitor for a relatively short time. As such, a voltage level of the output voltage Vout0 is relatively low. Therefore, a length of time during which the transistor M0 conducts is correlated with the output voltage Vout0. The transistor M0 regulates the output voltage Vout0 by adjusting the length of time during which the transistor M0 conducts.

In an embodiment, the transistor M0 includes a metal-oxide-semiconductor field-effect transistor (MOSFET). In another embodiment, the transistor M0 includes a high voltage MOSFET capable of operating at 700 volts or above. Alternatively, the transistor M0 includes bipolar junction transistors (BJTs), complementary MOS (CMOS) transistors, or the like. In one or more embodiments, the transistor M0 includes a power field-effect transistor (FET), such as a double-diffused metal-oxide-semiconductor (DMOS) transistor. In yet other embodiments, the transistor M0 includes another suitable device, such as an insulated-gate bipolar transistor (IGBT), a field effect transistor (FET), or the like. In the present embodiment, the transistor M0 includes a p-type metal-oxide-semiconductor (PMOS) field-effect transistor. In another embodiment, the transistor M0 includes an n-type metal-oxide-semiconductor (NMOS) field-effect transistor. Although only one gate structure is illustrated, it is understood that the transistor M0 may include a number of gate structures for PMOS transistors, including short channel and long channel transistors.

The controller 100 functions to determine a duty cycle associated with a length of time during which the transistor M0 conducts. In addition, the controller 100, based on the determined duty cycle, controls the length of time during which the transistor M0 conducts. In further detail, the controller 100 obtains a sensed output voltage by sensing the output voltage Vout0. The controller 100 compares the sensed output voltage with a basis reference voltage Vref0, and adjusts, based on the comparison result, the duty cycle of the transistor M0. In an embodiment, the controller 100 includes a pulse width modulation (PWM) device. In another embodiment, the controller 100 includes any device capable of performing a pulse-width-modulation operation.

In operation, the output voltage Vout0 of the voltage system 10 may drop, from, for example, about 1.2 volts (V) to, for example, about 0.9V. The controller 100 senses the dropped output voltage of about 0.9V, and compares the sensed output voltage of about 0.9V with the basis reference voltage Vref0 of, for example, about 1V. Based on the comparison result, the controller 100 determines that the output voltage Vout0 has dropped, and the controller 100 adjusts the duty cycle of the transistor M0. As such, the dropped output voltage of 0.9V will be increased to about 1.2V. Since the voltage drop (from about 1.2V to about 0.9V) is relatively small, a relatively short time is required to increase the output voltage Vout0 from a reduced level of about 0.9V back to a desired level of about 1.2V.

However, in some operations, the output voltage Vout0 of the voltage system 10 may drop drastically. For example, it is assumed that the output voltage Vout0 serves as a supply voltage for a load. When an operation mode of the load is changed from a light-load mode to a heavy-load mode, the output voltage Vout0 may drop drastically, from example, from about 1.2V to about 0.8V. In such scenario, a relatively long time is required to increase the output voltage Vout0 from a drastically reduced level of about 0.8V back to a desired level of about 1.2V.

Figure 2:
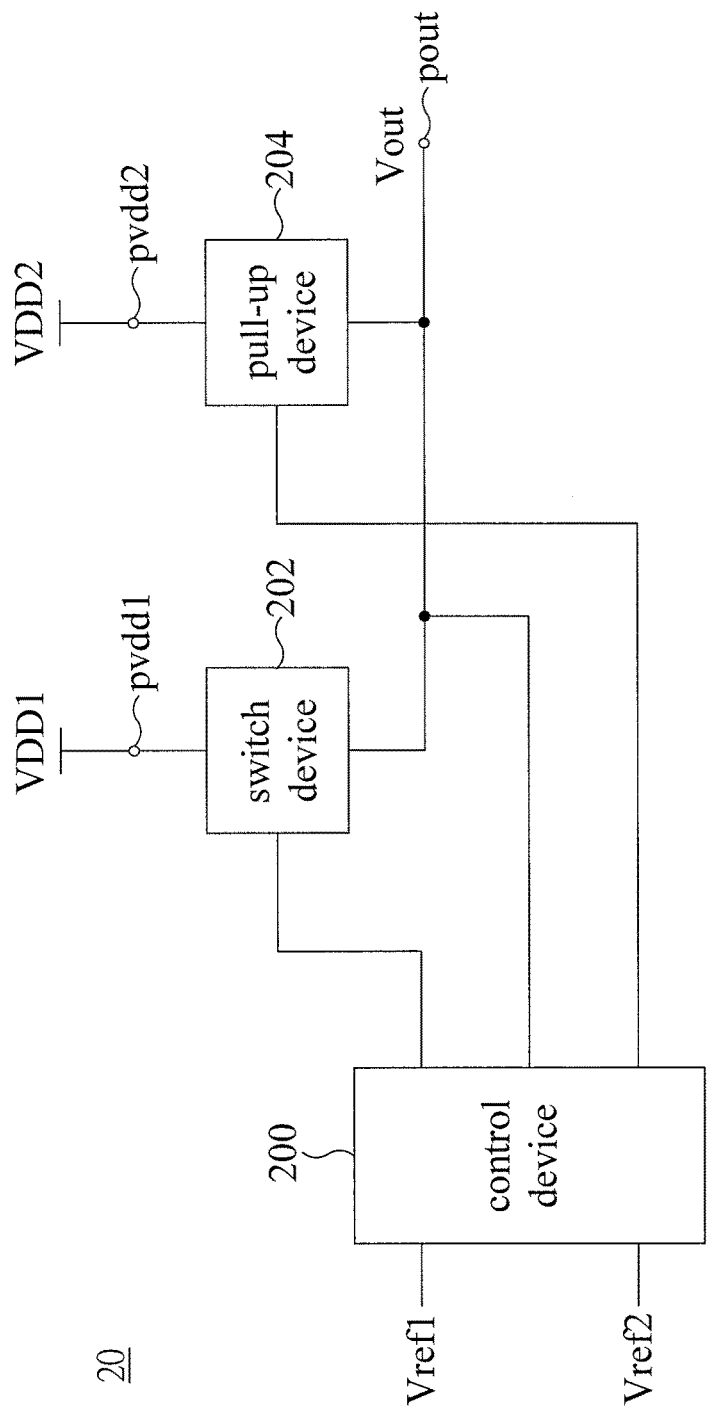
FIG. 2 is a circuit diagram of a voltage system, in accordance with an embodiment of the present disclosure.

FIG. 2 is a circuit diagram of a voltage system 20, in accordance with an embodiment of the present disclosure. Referring to FIG. 2, the voltage system 20 operates in a power domain defined by a basis supply voltage VDD1 and a supply voltage VDD2. The voltage system 20 is similar to the voltage system 10 described and illustrated with reference to FIG. 1 except that, for example, the voltage system 20 includes a control device 200, a switch device 202 and a pull-up device 204.

The switch device 202, coupled between a basis supply voltage port pvdd1 of the voltage system 20 and the output port pout of the voltage system 20, functions to regulate an output voltage Vout at the output port pout of the voltage system 20. In further detail, due to connection of the switch device 202 to the basis supply voltage VDD1 via the basis supply voltage port pvdd1, when the switch device 202 conducts for a relatively long time, the basis supply voltage VDD1 charges, for example, a capacitor (not shown) coupled to the output port pout for a relatively long time. As such, a voltage level of the output voltage Vout is relatively high. Alternatively, when the switch device 202 conducts for a relatively short time, the basis supply voltage VDD1 charges the capacitor for a relatively short time. As such, a voltage level of the output voltage Vout is relatively low. Therefore, a length of time during which the switch device 202 conducts is correlated with the output voltage Vout. The switch device 202 regulates the output voltage Vout by adjusting the length of time during which the switch device 202 conducts.

The pull-up device 204, coupled between a supply voltage port pvdd2 of the voltage system 20 and the output port pout of the voltage system 20, functions to pull up the output voltage Vout of the voltage system 20 while the pull-up device 204 is activated. In further detail, due to connection of the pull-up device 204 to the supply voltage VDD2, while the pull-up device 204 is activated, the supply voltage VDD2 charges, for example, the capacitor through the pull-up device 204. During the period while the pull-up device 204 is activated, the supply voltage VDD2 continually charges the capacitor. That is, while the pull-up device 204 is activated, the capacitor is charged not only by the basis supply voltage VDD1 through the switch device 202, but also by the supply voltage VDD2 through the pull-up device 204. As a result, a relatively short time is required to increase the output voltage Vout0 from a drastically reduced level back to a desired level. In an embodiment, the basis supply voltage VDD1 is different from the supply voltage VDD2. In another embodiment, the supply voltage VDD2 is higher than the basis supply voltage VDD1. In an embodiment in which the supply voltage VDD2 is higher than the basis supply voltage VDD1, a length of a time for increasing the output voltage Vout from a reduced level to a desired level is less than that of an embodiment in which the supply voltage VDD2 and the basis supply voltage VDD1 are the same.

The control device 200 functions to determine a duty cycle associated with a length of time during which the switch device 202 conducts. In addition, the control device 200, based on the determined duty cycle, controls the length of time during which the switch device 202 conducts. In further detail, the control device 200 obtains a sensed output voltage by sensing the output voltage Vout. The control device 200 compares the sensed output voltage with a basis reference voltage Vref1, and adjusts, based on the comparison result, the duty cycle of the switch device 202. In an embodiment, the control device 200 includes a pulse width modulation (PWM) device. In another embodiment, the control device 200 includes any device capable of performing a pulse-width-modulation operation. In an embodiment, the control device 200 is directly connected to the output port pout of the voltage system 20.

Moreover, the control device 200 functions to activate the pull-up device 204 when the output voltage Vout is lower than a reference voltage Vref2. The reference voltage Vref2 is lower than the basis reference voltage Vref1. For example, the reference voltage Vref2 is about 0.9V, and the basis reference voltage Vref1 is about 1.0V. In further detail, the control device 200 functions to obtain a sensed output voltage by sensing the output voltage Vout. Additionally, the control device 200, based on the sensed output voltage, determines whether to activate the pull-up device 204. When the sensed output voltage of, for example, about 0.8V, is lower than the reference voltage Vref2 of, for example, about 0.9V, the control device 200 activates the pull-up device 204. In contrast, when the sensed output voltage is higher than the reference voltage Vref2, the control device 200 does not activate the pull-up device 204 and therefore the pull-up device 204 does not increase the output voltage Vout.

Figure 3:
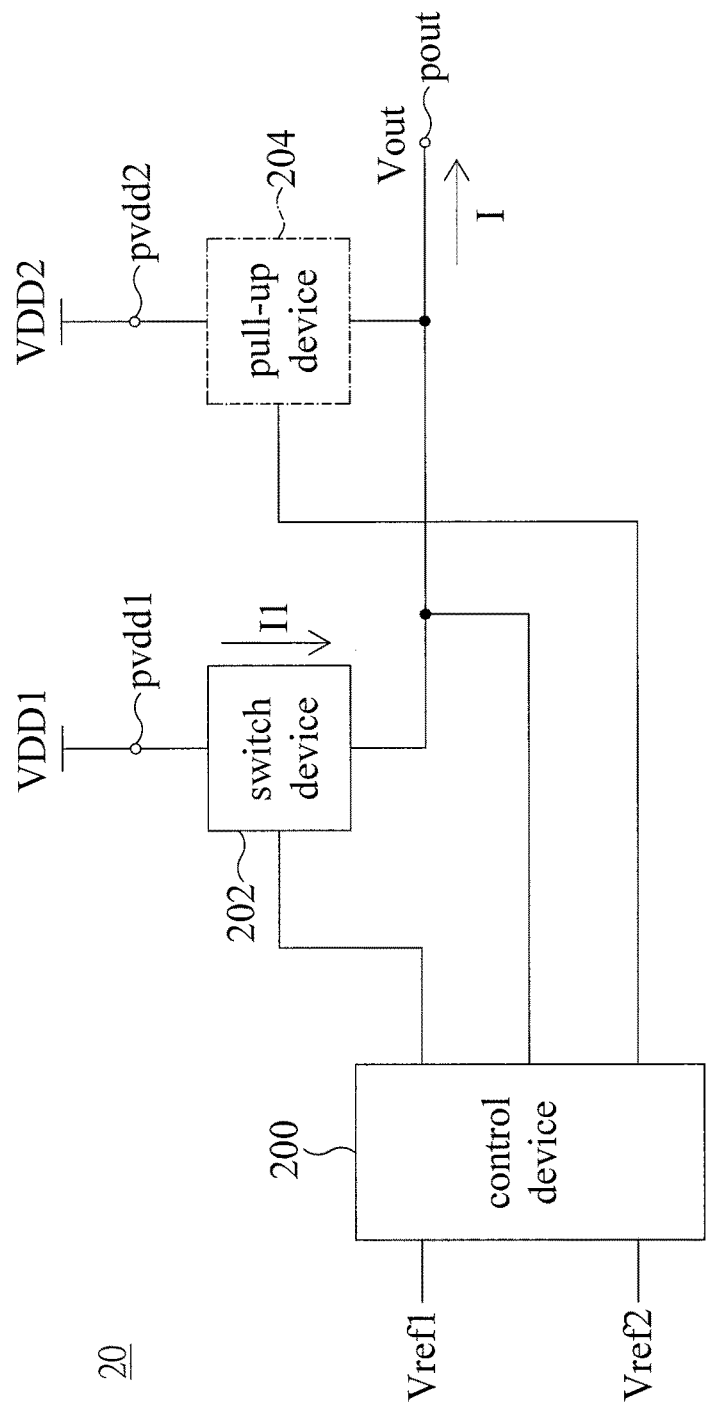
FIG. 3 is a circuit diagram illustrating an operation of the voltage system of FIG. 2, in accordance with an embodiment of the present disclosure.

FIG. 3 is a circuit diagram illustrating an operation of the voltage system 20 of FIG. 2, in accordance with an embodiment of the present disclosure. Referring to FIG. 3, in the present operation, the sensed output voltage is higher than the reference voltage Vref2. Consequently, the control device 200 does not activate the pull-up device 204. The switch device 202 contributes a current I1 to a current I conducting to the output port pout. Since the pull-up device 204 is not activated, the pull-up device 204 does not contribute a current to the current I1.

Figure 4:
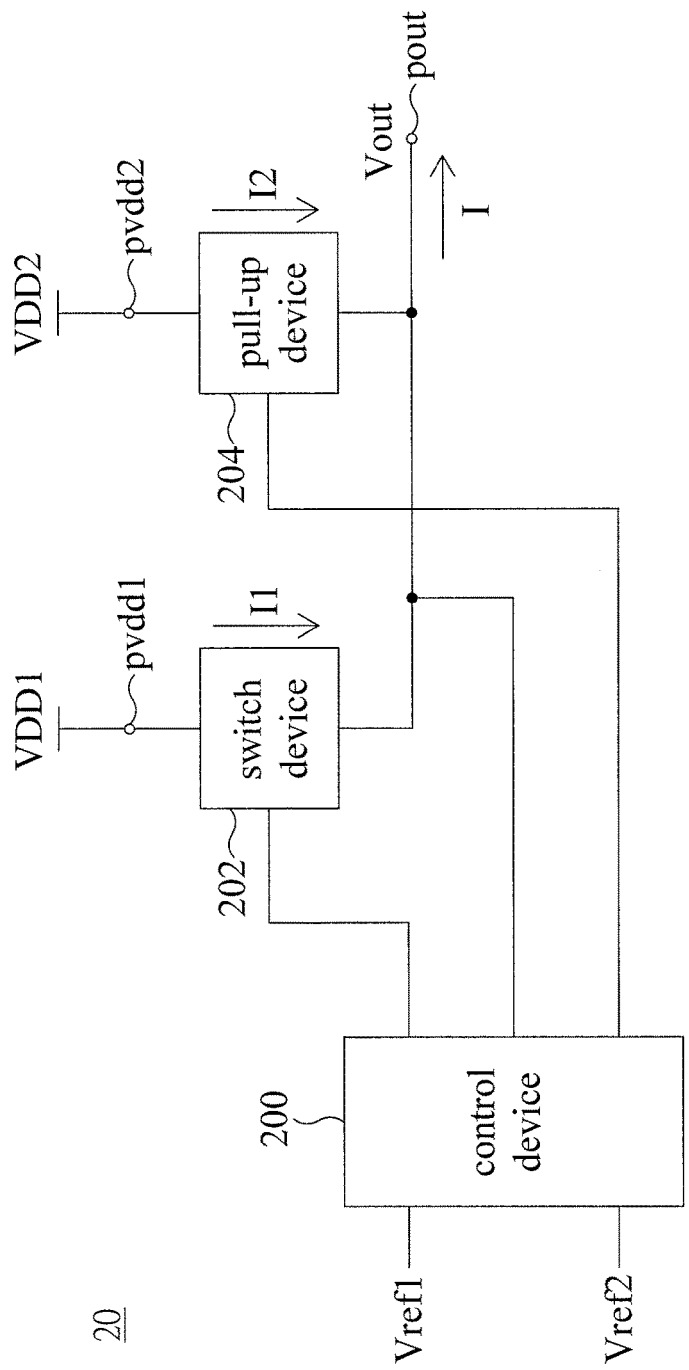
FIG. 4 is a circuit diagram illustrating another operation of the voltage system of FIG. 2, in accordance with an embodiment of the present disclosure.

FIG. 4 is a circuit diagram illustrating another operation of the voltage system 20 of FIG. 2, in accordance with an embodiment of the present disclosure. Referring to FIG. 4, the sensed output voltage is lower than the reference voltage Vref2, which means that the output voltage Vout has dropped drastically. Consequently, the control device 200 activates the pull-up device 204. Because the pull-up device 204 is activated, the pull-up device 204 contributes a current I2 as a second portion of the current I, and the switch device 202 contributes a current I1 as a first portion of the current I. With the pull-up device 204, a relatively short time is required to increase the output voltage Vout0 from a drastically reduced level of, for example, about 0.8V back to a desired level of, for example, about 1.2V.

Figure 5:
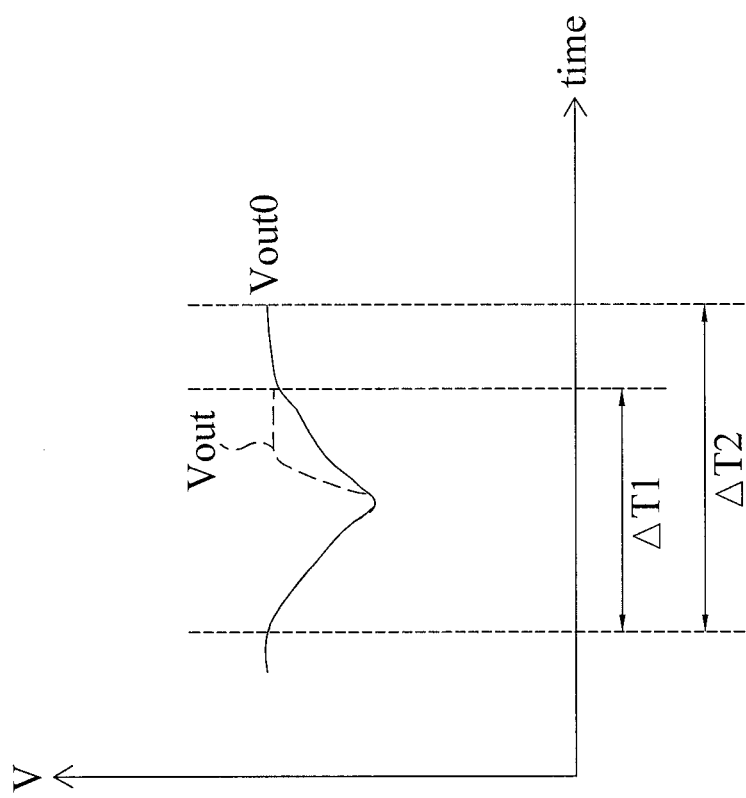
FIG. 5 is a wave diagram illustrating recovery time required for the voltage system of FIG. 1 and the voltage system of FIG. 2, in accordance with an embodiment of the present disclosure.

FIG. 5 is a wave diagram illustrating recovery time required for the voltage system 10 of FIG. 1 and the voltage system 20 of FIG. 2, in accordance with an embodiment of the present disclosure. Referring to FIG. 5, the horizontal axis represents timing and the vertical axis represents voltage. By using the voltage system 20 of FIG. 2, the recovery time ΔT1 is kept relatively short. In comparison, by using the voltage system 10 of FIG. 1, the recovery time ΔT2 is relatively long. As a result, as observed from FIG. 1, it can be realized that only a relatively short length of time is required to adjust the output voltage Vout of the voltage system 20 from a drastically reduced level back to a desired level.

Figure 6:
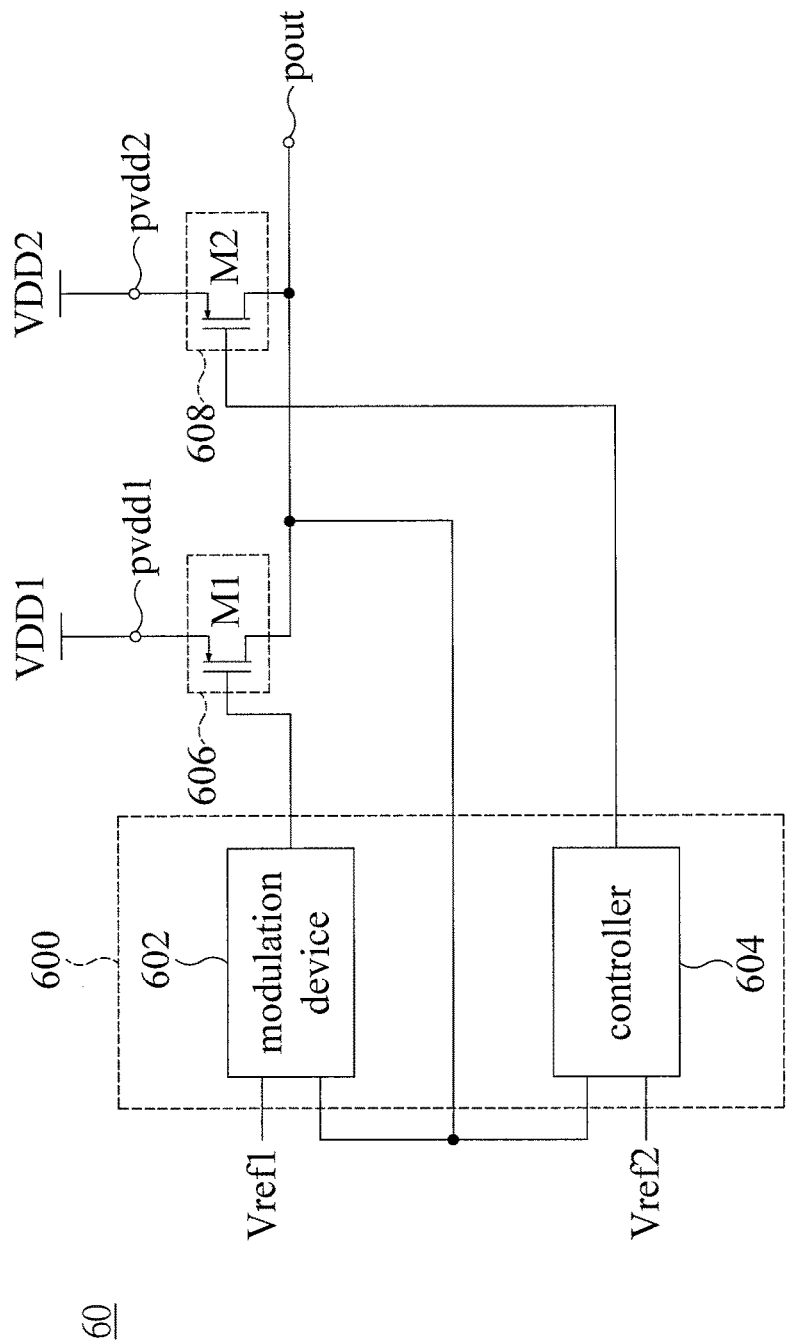
FIG. 6 is a circuit diagram of another voltage system, in accordance with an embodiment of the present disclosure.

FIG. 6 is a circuit diagram of another voltage system 60, in accordance with an embodiment of the present disclosure.

Referring to FIG. 6, the voltage system 60 is similar to the voltage system 20 described and illustrated with reference to FIG. 2 except that, for example, the voltage system 60 includes a control device 600 including a modulation device 602 and a controller 604, a switch device 606 including a first transistor M1, and a pull-up device 608 including a second transistor M2.

The modulation device 602 functions to, based on the basis reference voltage Vref1 and the sensed output voltage, determine a duty cycle associated with a length of time during which the first transistor M1 conducts, and the modulation device 602 also functions to adjust the duty cycle of the switch device 606 including the first transistor M1. Operation of the modulation device 602 is similar to operation of the control device 200 as previously discussed. Therefore, the detailed description is omitted herein.

The controller 604, independent of the modulation device 602, functions to, based on the reference voltage Vref2 and the sensed output voltage, determine whether to activate the pull-up device 608 including the second transistor M2, and activate the second transistor M2 when the sensed output voltage is lower than the reference voltage Vref2, as previously discussed. For example, when the sensed output voltage is lower than the reference voltage Vref2, the controller 604 provides a voltage equal to the supply voltage VDD2 to a gate of the second transistor M2 when the second transistor is a PMOS transistor so as to deactivate the second transistor M2, and vice versa. Some detailed descriptions are similar to those discussed in the embodiment of FIG. 2, and therefore are omitted herein.

A first source of the first transistor M1 is coupled to a basis supply voltage port pvdd1, and a first drain of the first transistor M1 is coupled to the output port pout. In an embodiment, the first transistor M1 includes a metal-oxide-semiconductor field-effect transistor (MOSFET). In another embodiment, the first transistor M1 includes a high voltage MOSFET capable of operating at 700 volts or above. Alternatively, the first transistor M1 includes bipolar junction transistors (BJTs), complementary MOS (CMOS) transistors, or the like. In one or more embodiments, the first transistor M1 includes a power field-effect transistor (FET), such as a double-diffused metal-oxide-semiconductor (DMOS) transistor. In yet other embodiments, the first transistor M1 includes another suitable device, such as an insulated-gate bipolar transistor (IGBT), a field effect transistor (FET), or the like. In the present embodiment, the first transistor M1 includes a p-type metal-oxide-semiconductor (PMOS) field-effect transistor. In another embodiment, the first transistor M1 includes an n-type metal-oxide-semiconductor (NMOS) field-effect transistor. Although only one gate structure is illustrated, it is understood that the first transistor M1 may include a number of gate structures for PMOS transistors, including short channel and long channel transistors.

A second source of the second transistor M2 is coupled to a supply voltage port pvdd2, and a second drain of the second transistor M2 is coupled to the output port pout. A gate of the second transistor M2 is controlled by the controller 604. In an embodiment, the second transistor M2 includes a metal-oxide-semiconductor field-effect transistor (MOSFET). In another embodiment, the second transistor M2 includes a high voltage MOSFET capable of operating at 700 volts or above. Alternatively, the second transistor M2 includes bipolar junction transistors (BJTs), complementary MOS (CMOS) transistors, or the like. In one or more embodiments, the second transistor M2 includes a power field-effect transistor (FET), such as a double-diffused metal-oxide-semiconductor (DMOS) transistor. In yet other embodiments, the second transistor M2 includes another suitable device, such as an insulated-gate bipolar transistor (IGBT), a field effect transistor (FET), or the like. In the present embodiment, the second transistor M2 includes a p-type metal-oxide-semiconductor (PMOS) field-effect transistor. In another embodiment, the second transistor M2 includes an n-type metal-oxide-semiconductor (NMOS) field-effect transistor. Although only one gate structure is illustrated, it is understood that the second transistor M2 may include a number of gate structures for PMOS transistors, including short channel and long channel transistors.

Figure 7:
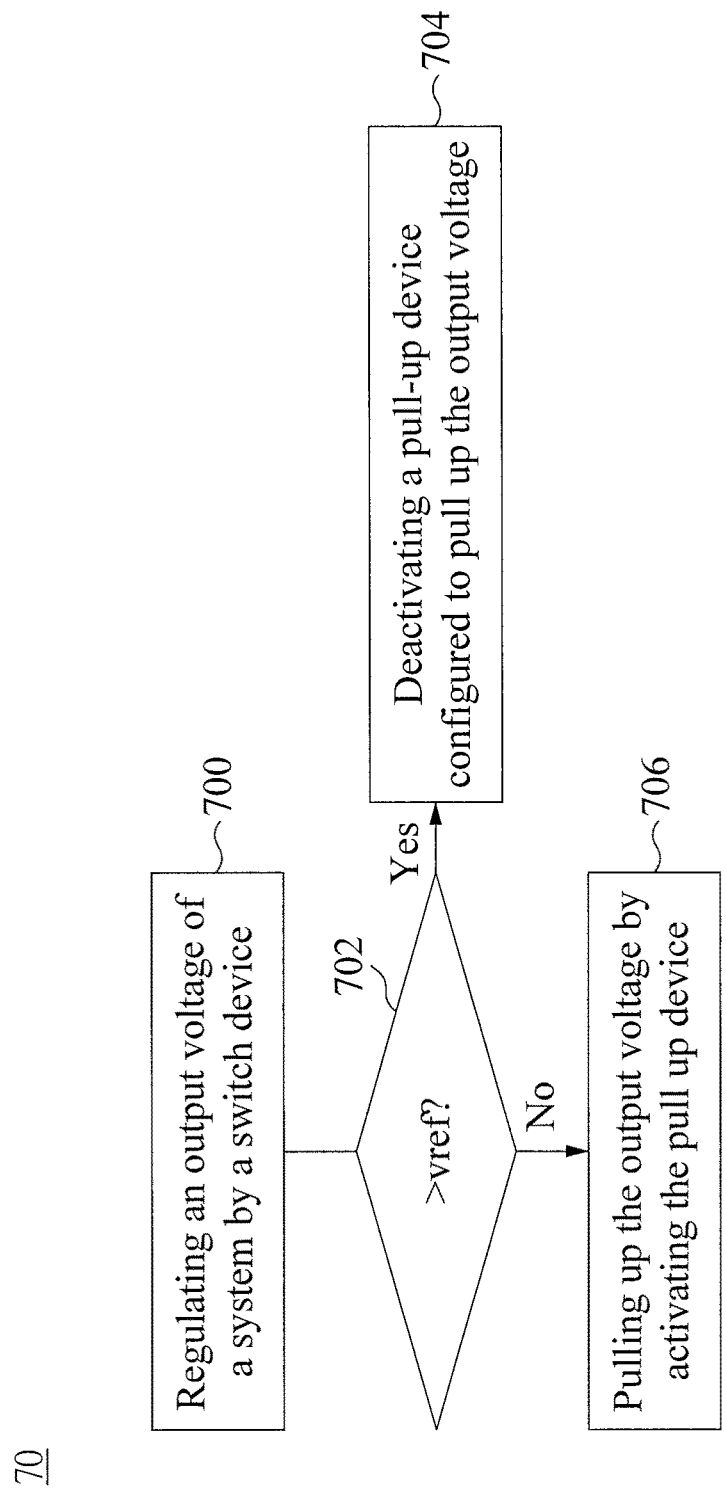
FIG. 7 is a schematic diagram of a method of operating a voltage system, in accordance with an embodiment of the present disclosure.

FIG. 7 is a schematic diagram of a method 70 of operating a voltage system, in accordance with an embodiment of the present disclosure. Referring to FIG. 7, the method 70 includes operations 700, 702, 704 and 706.

The method 70 begins with operation 700, in which an output voltage of a system is regulated by a switch device. For example, referring to FIG. 6, the output voltage Vout is regulated by the switch device 606.

The method 70 proceeds to operation 702, in which it is determined whether a sensed output voltage is higher than a reference voltage Vref. For example, referring to FIG. 6, the controller 604 determines whether the sensed output voltage is higher than the reference voltage Vref2. If affirmative, referring to FIG. 7, the method 70 proceeds to operation 704, in which a pull-up device configured to pull up the output voltage is deactivated. For example, referring to FIG. 6, the controller 604 deactivates the pull-up device 608. If negative, referring again to FIG. 7, the method 70 proceeds to operation 706, in which the output voltage is pulled up by activating the pull-up device. For example, referring to FIG. 6, the controller 604 activates the pull-up device 608, and the pull-up device 608 pulls up the output voltage.

In the present disclosure, due to connection of the pull-up device 204 to the supply voltage VDD2, while the pull-up device 204 is activated, the supply voltage VDD2 charges, for example, the capacitor through the pull-up device 204. During the period while the pull-up device 204 is activated, the supply voltage VDD2 continually charges the capacitor. That is, while the pull-up device 204 is activated, the capacitor is charged not only by the basis supply voltage VDD1 through the switch device 202, but also by the supply voltage VDD2 through the pull-up device 204. As a result, a relatively short recovery time is required to increase the output voltage Vout from a drastically reduced level back to a desired level.

In some existing voltage systems, the existing voltage system may only include a device configured to regulate an output voltage of the existing voltage system. That is, a capacitor coupled to an output port of the existing voltage system is charged only by a single voltage through the device. When an operation mode of a load coupled to the output port is changed from a light-load mode to a heavy-load mode, the output voltage Vout0 may drop drastically. In such scenario, a relatively long time is required to increase the output voltage from a drastically reduced level back to a desired level.

One aspect of the present disclosure provides a voltage system. The voltage system includes a switch device configured to regulate an output voltage at an output port of the voltage system; a pull-up device configured to pull up the output voltage of the voltage system while the pull-up device is activated; and a control device configured to activate the pull-up device when the output voltage is lower than a reference voltage.

Another aspect of the present disclosure provides a method of operating a voltage system, comprising: regulating an output voltage of the voltage system by a switch device; determining whether the output voltage is lower than a reference voltage; deactivating a pull-up device configured to pull up the output voltage when the determination indicates that the output voltage is higher than the reference voltage; and pulling up the output voltage by activating the pull-up device when the determination indicates that the output voltage is lower than the reference voltage.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A voltage system, comprising:
    a switch device connected to a basis supply voltage port and an output port of the voltage system and configured to regulate an output voltage at the output port of the voltage system;
    a pull-up device connected to a supply voltage port and the output port of the voltage system and configured to pull up the output voltage at the output port of the voltage system while the pull-up device is activated, wherein the pull-up device includes a transistor, and the transistor includes a source coupled to supply voltage port and a drain coupled to the output port; and
    a control device, including a pulse width modulation device, connected to the switch device, the pull-up device and a reference voltage and configured to adjust the duty cycle of the switch device and to activate the pull-up device when the output voltage is lower than the reference voltage, wherein the control device is further connected to a basis reference voltage and includes the pulse width modulation device and a controller independent from each other, wherein the pulse width modulation device is configured to, based on the basis reference voltage and the output voltage, adjust a duty cycle of the switch device, and the controller is configured to, based on the reference voltage and the output voltage, determine whether to activate the pull-up device;
    wherein the switch device receives the basis supply voltage and the supply voltage is higher than the basis supply voltage.

2. The voltage system of claim 1, wherein the control device is further configured to obtain a sensed output voltage by sensing the output voltage, and configured to, based on the sensed output voltage, determine whether to activate the pull-up device.

3. The voltage system of claim 1, wherein the control device is directly connected to the output port.

4. The voltage system of claim 1, wherein, while the pull-up device is activated, the switch device contributes a first portion of a current conducting to the output port, and the pull-up device contributes a second portion of the current conducting to the output port.

5. The voltage system of claim 1, wherein, during a period of time that the output voltage is lower than the reference voltage, the controller continually activates the pull-up device.

6. The voltage system of claim 1, wherein a gate of the transistor is controlled by the controller.

7. The voltage system of claim 1, wherein the transistor is a second transistor, and the switch device includes a first transistor, wherein the first transistor includes a first source coupled to the basis supply voltage port, and the first transistor further includes a first drain coupled to the output port.

* * * * *